US009703021B1

(12) United States Patent
Loertscher et al.

(10) Patent No.: US 9,703,021 B1
(45) Date of Patent: Jul. 11, 2017

(54) ACTIVELY MODULATED PLASMONIC DEVICES

(71) Applicant: International Business Machines Corporation, Armonk, NY (US)

(72) Inventors: Emanuel Loertscher, Bonstetten (CH); Kirsten Moselund, Rüschlikon (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/979,959

(22) Filed: Dec. 28, 2015

(51) Int. Cl.
| G02F 1/035 | (2006.01) |
| G02B 5/00 | (2006.01) |
| G02F 1/015 | (2006.01) |
| G02F 1/025 | (2006.01) |
| G02B 6/122 | (2006.01) |
| G02B 6/12 | (2006.01) |

(52) U.S. Cl.
CPC .......... *G02B 5/008* (2013.01); *G02B 6/1226* (2013.01); *G02F 1/015* (2013.01); *G02F 1/025* (2013.01); *G02B 2006/12142* (2013.01); *G02F 2203/10* (2013.01); *G02F 2203/13* (2013.01); *G02F 2203/50* (2013.01)

(58) Field of Classification Search
CPC ........ G02B 6/1226; G02B 2006/12142; G02F 2203/10; G02F 2203/13; G02F 2203/50
USPC .............................. 385/2; 359/237, 238, 245
See application file for complete search history.

(56) References Cited

U.S. PATENT DOCUMENTS

| 7,627,206 B2 * | 12/2009 | Hyde ..................... B82Y 20/00 385/16 |
| 8,749,866 B2 | 6/2014 | Sweatlock et al. |
| 8,983,251 B2 * | 3/2015 | Lu et al. .................. G02B 6/10 385/40 |
| 9,014,521 B1 | 4/2015 | Sayyah |

(Continued)

OTHER PUBLICATIONS

"Unity-order index change in transparent conducting oxides at visible frequencies" by Feigenbaum et al, Nanolatters, vol. 10, pp. 2111-2116, 2011.*

(Continued)

*Primary Examiner* — Robert Tavlykaev
(74) *Attorney, Agent, or Firm* — Cantor Colburn LLP; David Quinn (57) ABSTRACT

Embodiments include various plasmonic devices. The plasmonic devices may include: a conductor layer, an insulator layer, and a hybrid layer. The conductor layer may include an input segment, a manipulation segment, and an output segment. The conductor layer is disposed on a surface of a substrate. The insulator layer is disposed on a top surface of the conductor layer. The hybrid layer is disposed on top surface of insulator layer. The manipulation hybrid layer may include an input segment and a semiconductor segment, output segment on one or two or multiple sides of the active channel. When a positive gate voltage is applied between the conductor segment of the conductor layer and the semiconductor segment of the hybrid layer, the semiconductor segment is turned into accumulated semiconductor, surface plasmons polaritons (SPP) propagate along the insulator layer freely. When the gate voltage is negative, the semiconductor segment is turned into depleted semiconductor, and SPP propagation ceases.

14 Claims, 5 Drawing Sheets

(56) References Cited

U.S. PATENT DOCUMENTS

| | | | | |
|---|---|---|---|---|
| 2003/0223668 | A1* | 12/2003 | Breukelaar | G02F 1/035 385/2 |
| 2009/0052827 | A1* | 2/2009 | Durfee | G02F 1/035 385/2 |
| 2014/0010509 | A1* | 1/2014 | Zayets | G02B 6/10 385/131 |
| 2014/0061832 | A1* | 3/2014 | Emboras | G02F 1/025 257/431 |
| 2014/0301694 | A1 | 10/2014 | Lee et al. | |

OTHER PUBLICATIONS

Bozhevolny, et al., "Channel plasmon subwavelength waveguide components including interferometers and ring resonators", Nature, vol. 440, Mar. 23, 2006, pp. 508-511, Nature Publishing Group. DOI:10.1038/nature04594.

Briggs, et al., "Efficient Coupling between Dielectric-Loaded Plasmonic and Silicon Photonic Waveguides", Nano Letters, 2010, 10 (12), pp. 4851-4857, Publication Date (Web): Oct. 28, 2010, ACS Publications. DOI: 10.1021/nl1024529.

çetin, et al., "Field-effect active plasmonics for ultracompact electro-optic switching", Applied Physics Letters, vol. 101, Issue 12, Published Online: Sep. 2012, 5 Pages, American Institute of Physics. DOI: http://dx.doi.org/10.1063/1.4754139.

Dionne, et al., "PlasMOStor: A Metal-Oxide-Si Field Effect Plasmonic Modulator", Nano Letters, 2009, vol. 9, No. 2, Pages 897-902, Publication Date (Web): Jan. 26, 2009, ACS Publications. DOI: 10.1021/nl803868k.

Emboras, et al., "Electrically Controlled Plasmonic Switches and Modulators", IEEE Journal of Selected Topics in Quantum Electronics, Jul./Aug. 2015, 8 pages, vol. 21, No. 4, IEEE.

Hill, "Metal-Insulator-Metal Waveguides With Self Aligned and Electrically Contacted Thin Semiconductor Cores Exhibiting High Optical Confinement and Low Loss", Journal of Lightwave Technology, vol. 31, No. 15, Aug. 1, 2013, pp. 2540-2549, IEEE. DOI: 10.1109/JLT.2013.2269611.

Kurgin, et al., "Practicality of compensating the loss in the plasmonic waveguides using semiconductor gain medium", Applied Physics Letters 100, 011105 (2012), 4 Pages, American Institute of Physics. DOI: 10.1063/1.3673849.

Khurgin, et al., "Reflecting upon the losses in plasmonics and metamaterials", MRSBulletin, Aug. 2012, vol. 37, Issue 8, pp. 768-779, Published online: Aug. 15, 2012. DOI: https://doi.org/10.1557/mrs.2012.173.

Law, et al., "Mid-infrared designer metals", May 21, 2012, pp. 12155-12165, vol. 20, No. 11, Optics Express. URL: https://doi.org/10.1364/OE.20.012155.

Rosenberg, et al., "Flat mid-infrared composite plasmonic materials using lateral doping-patterned semiconductors", Journal of Optics, Sep. 3, 2014, J. Opt. 16 (2014) 094012 (9pp), IOP Publishing, UK. DOI: 10.1088/2040-8978/16/9/094012.

Zhu, et al., "Electro-absorption modulation in horizontal metal-insulator-siliconinsulator-metal nanoplasmonic slot waveguides", Applied Physics Letters, vol. 99, Issue 15, Published Online: Oct. 2011, 4 Pages, American Institute of Physics. DOI: http://dx.doi.org/10.1063/1.3653240.

\* cited by examiner

ACTIVELY MODULATED PLASMONIC DEVICES

BACKGROUND

The present disclosure relates generally to information systems, and more particularly to actively modulated plasmonic components.

Information can be transferred electrically through copper wires, or optically through optical fibers and waveguides. Of equal importance as efficient data transmission is the manipulation of the information-carrying signal, in order to transmit, route or receive information. Here, the methods differ strongly between electrical and optical domains mainly because of their underlying physical mechanisms. Whereas active electronic building blocks, e.g. transistors, are nowadays well below 100 nm in size, the optical counterparts are several 100 μm up to mm's in size, fundamentally limited by the diffraction limit and electro-optical manipulation efficiencies. These boundary conditions constitute a large size discrepancy being present between the electronic and optical building blocks. This offsets the greater bandwidth and speed advantages of photonic concepts and limits the attractiveness of a co-integration of optical and electronic components on the same platform with similar integration densities.

Collective oscillations of electrons in a medium with free or mobile charge carriers, e.g. a metal or a highly-doped semiconductor, coupled to an optical wave at the interface of the metal and a dielectric are called Surface Plasmon Polaritons (SPP). SPPs enable light to be confined to volumes of a few tens of $nm^3$ which enables light to be manipulated below the diffraction limit with very high efficiencies and further also guided along the dielectric-conductor interface at optical subwavelength dimensions and at optical frequencies. On the one hand, plasmon-based devices thus offer the potential of integrating optical components with dimensions much closer to state-of-the-art semiconductor electronic devices compared to today's photonic building blocks. This would enable not only increased bandwidth for short and long-range communication, electro-optical or all-optical switching etc., but furthermore a significant reduction in cost and total complexity due to the monolithic integration of electronic and optical components on a common platform. Therefore, it is desirable to create micrometer-sized low-loss plasmonic modulators, switches, routers and mixers for co-integration of electronics and optics at nanometer dimensions below the diffraction limit, based on manipulation of plasmon propagations by controlling the free charge carrier concentration in a nano-metal sized semiconductor segment seamlessly embedded into the SPP-carrying waveguide and being electrically controlled causing a conductor-to-insulator transition in the semiconductor segment.

Therefore, heretofore unaddressed needs still exist in the art to address the aforementioned deficiencies and inadequacies.

SUMMARY

In an embodiment of the present invention, a plasmonic device may include: a conductor layer, an insulator layer, and a hybrid layer. The conductor may include electrical conducting materials such as metals, high doped semiconductors, and various nano-tubes. The conductor layer has a top surface and a bottom surface. The bottom surface of the conductor layer is generally disposed on a surface of a substrate. In certain embodiments, the conductor layer may include an input conductor segment, a manipulation conductor segment, and an output conductor segment. The insulator layer may include a top surface and a bottom surface, an input end, and an output end. The bottom surface of the insulator layer is disposed on the top surface of the conductor layer. The hybrid layer may include a top surface and a bottom surface. The bottom surface of the semiconductor layer is disposed on the top surface of the insulator layer. In certain embodiments, the hybrid layer may include an input segment, a semiconductor segment, and an output segment.

In certain embodiments, a gate voltage $V_G$ is applied between two or more conductor segments of the hybrid layer such that surface plasmon polaritons (SPP) propagate from the input end to the output end of the insulator layer when the gate voltage $V_G$ is set to accumulate the semiconductor segment via an electric field. When the gate voltage $V_G$ is set to deplete the semiconductor segment via the electric field, and the SPP propagation ceases.

In certain embodiments, one or two conductor layers are partially replaced by a semiconductor with an adjacent conductor layer to be employed as an electrical gate to induce a conductor-insulator transition in the semiconductor. By local depletion or accumulation, a selected region of the plasmonic waveguide may be selectively turned off or on (or any state in between) to control signal transmission across this functional segment. In certain embodiments, the segments of the hybrid layer, and the conductor segment of the conductor layer may be arranged in various shapes to form various plasmonic devices such as switches, modulators, routers, mixers, combiners, and splitters.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "plurality" means two or more. The terms "comprising," "including," "carrying," "having," "containing," "involving," and the like are to be understood to be open-ended, i.e., to mean including but not limited to.

"SPP" stands for Surface Plasmon Polaritons.

The present disclosure will now be described more fully hereinafter with reference to the accompanying drawings FIGS. 1-5, in which certain exemplary embodiments of the present disclosure are shown. The present disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

Figure 1:
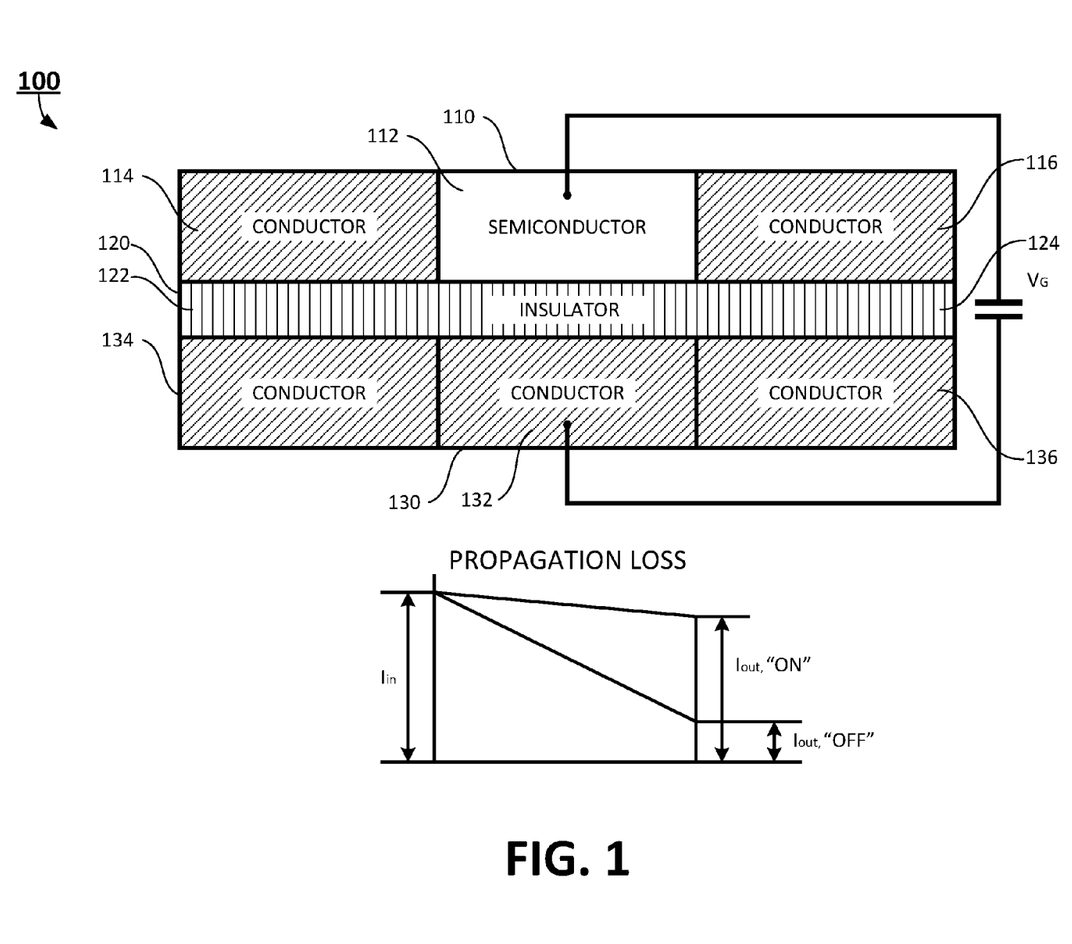
FIG. 1 shows a sectional view of a hybrid conductor-semiconductor-conductor plasmonic device and a corresponding propagation distance-loss diagram in accordance with exemplary embodiments of the present disclosure.

Referring now to FIG. 1, a sectional view of a hybrid conductor-semiconductor-conductor plasmonic device 100 and a corresponding propagation distance-loss diagram in accordance with exemplary embodiments of the present disclosure are shown in accordance with exemplary embodiments of the present disclosure. The hybrid conductor-semiconductor-conductor plasmonic device 100 may include: a conductor layer 130, an insulator layer 120, and a hybrid layer 110. The conductor layer 130 has a top surface and a bottom surface. The bottom surface of the conductor layer 130 is disposed on a surface of a substrate. In certain exemplary embodiments, the conductor layer 130 may include an input segment 134, a conductor segment 132, and an output segment 136. In certain embodiments, the segments 134, 132 and 136, may include electrical conducting materials such as metals, high doped semiconductors, and various nano-tubes, and may be electronically isolated from one another by a thin dielectric layer.

In certain embodiments, the insulator layer 120 may include a top surface and a bottom surface, an input end 122, and an output end 124. The bottom surface of the insulator layer 120 is disposed on the top surface of the conductor layer 130. The hybrid layer 110 may include a top surface and a bottom surface. The bottom surface of the semiconductor layer 110 is disposed on the top surface of the insulator layer 120. In certain embodiments, the hybrid layer 110 may include an input conductor segment 114, a semiconductor segment 112, and an output conductor segment 116. In certain embodiments, the segments 112, 114 and 116 may include electrical conducting materials such as metals, high doped semiconductors, and various nano-tubes, and may be electronically isolated from one another by a thin dielectric layer (not shown). The bottom surface of the hybrid layer 110 is in direct contact with the top surface of the insulator layer 120, and the top surface of the conductor layer 130 is in direct contact with the bottom surface of the insulator layer 120, spatially forming a plasmonic conductor-insulator-conductor waveguide around the insulator layer 120. Surface Plasmon Polaritons (SPPs) are propagating along conductor-insulator or semiconductor-insulator interfaces. The plasmonic waveguide leads to a confinement of the propagating plasmonic waves so that most of its energy is contained within an insulator channel of the insulator layer 120, and with evanescent fields penetrating into the conductor layer 130 and hybrid layer 110 on either side.

In certain embodiments, one or more sections of the conductor cladding are replaced by one or more semiconductor segments. These semiconductor segments are in direct contact with the insulator layer 120, forming a continuing path for SPP propagation. These semiconductor segments are electrically addressable enabling a bias to be applied in respect to the adjacent conductor layer. As shown in FIG. 1, a gate voltage $V_G$ is applied between the semiconductor segment 112 of the hybrid layer 110 and the conductor segment 132 of the conductor layer 130. By the electrically activated gate and the field effect in the semiconductor, the charge-carrier density in the semiconductor can be changed. Such charge-carrier density influences the propagation of SPPs along the semiconductor-insulator interface. When the $V_G$ is set to accumulate the semiconductor such that the semiconductor may change to "metal-like" (accumulated semiconductor). When the $V_G$ is set to deplete the semiconductor, the semiconductor may change to "insulator-like" (depleted semiconductor). The chart in FIG. 1 illustrates the propagation loss of the plasmonic device 100 when the $V_G$ is applied between the semiconductor segment 112 of the hybrid layer 110 and the conductor segment 132 of the conductor layer 130. $I_{in}$ shows the SPP input density. When the $V_G$ is set to accumulate the semiconductor segment 112, the accumulated semiconductor segment 112 provides sufficient charge-carriers for SPP propagation along the accumulated semiconductor segment 112, therefore, the propagation loss is small and the $I_{OUT}$ is high, indicating an "ON" state. When the $V_G$ is set to deplete the semiconductor segment 112, the depleted semiconductor segment 112 suppress charge-carriers for SPP propagation along the depleted semiconductor segment 112, therefore, the propagation loss is high and the $I_{OUT}$ is low, indicating an "OFF" state. By changing the gate voltage $V_G$ between accumulation to depletion, effectively controlling the SPP propagation in the insulator layer 120 and turning the waveguide "on" or "off" for transmission.

In certain embodiments, the materials of the conductor layer 130 may include any good electrical conductor materials such gold, silver, copper, aluminum, titanium, platinum, and an alloy of these materials for applications in the visible range of the electromagnetic spectrum. For near-Infrared applications, these metals can also be replaced by highly doped semiconductors with possess less losses in the near-IR. To serve as one side of a conductor-insulator-conductor waveguide the conductor should be able to sustain an SPP mode, i.e. it should have a negative real part of its permittivity and reasonably low optical losses. The materials of the semiconductor segment 112 of the hybrid layer 110 may include: GaAs, AlGaAs, InGaAsP, InP, GaP, GaN, ZnSe, ZnS, ZnO, HgCdTe, CdTe, InSb, GaSb, InAs, AgBr, AgF, AgCl, and CdS, as well as some 2D semiconductor materials such as $WSe_2$, $MoS_2$, black phosphorous, grapheme etc. where the charge-carrier density can be modified. It is important for the efficiency of modulation that the layer thickness is kept relatively thin (1-20 nm), so that the hybrid layer is modulated more or less throughout its thickness. The insulator layer 120 may use: air, $SiO_2$; $Al_2O_3$, $Si_3N_4$, $BaTiO_3$, $ZrO_3$, a dielectric polymer, and any other suitable dielectric materials.

A plasmonic modulator or a plasmonic switch can be made according to the structure of the plasmonic device 100 described above.

Figure 2:
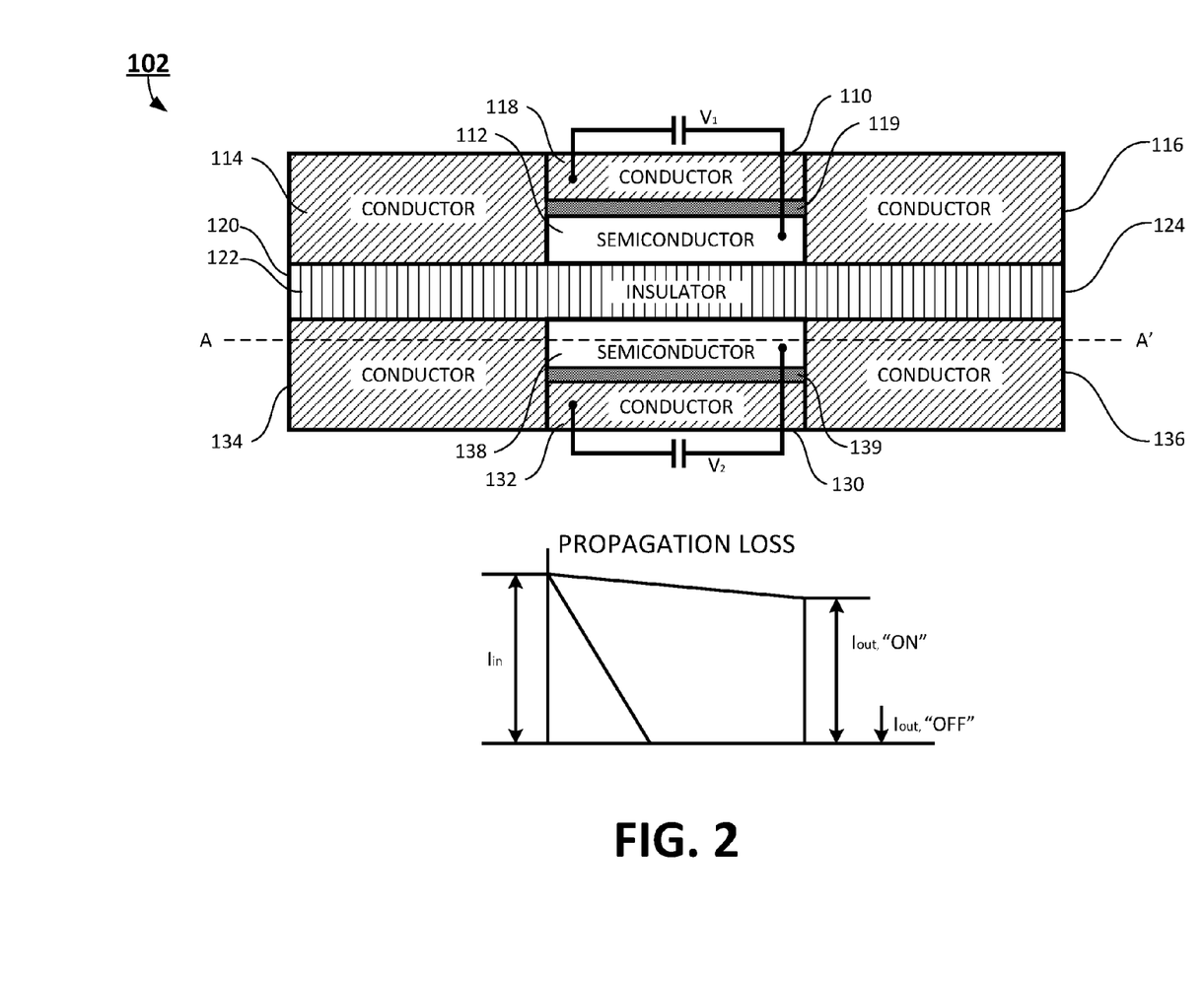
FIG. 2 shows a sectional view of a dual-side gate and semiconductor plasmonic device and a corresponding propagation loss chart in accordance with certain embodiments of the present disclosure.

Referring now to FIG. 2, a sectional view of a dual-side gate and semiconductor plasmonic device 102 and a corresponding propagation loss chart are shown. In certain embodiments, the conductor segment 132 of the conductor layer 130 further comprises a second semiconductor segment 138, which is separated from the conductor segment 132 by a thin dielectric layer 139. The second semiconductor segment 138 may be disposed between the dielectric layer 139, which is placed on top of the conductor segment 132 of the conductor layer 130 and the insulator layer 120. The semiconductor segment 112 of the hybrid layer 110 further comprises a second conductor segment 118, which is isolated from the hybrid segment 112, by a thin dielectric layer 119. The second conductor segment 118 may be disposed on the top surface of the thin dielectric layer 119, which is placed directly adjacent to the semiconductor segment 112 of the hybrid layer 110. A first gate voltage $V_1$ is applied between the second conductor segment 118 and the semiconductor segment 112 of the hybrid layer 210, and a second gate voltage $V_2$ is applied to the conductor segment 132 and the second semiconductor segment 138 of the conductor layer 130 to modulate the SPP propagation centered in the insulation layer 120 along the path from the input end 122 and the output end 124 of the insulator layer 120.

In certain embodiments, the dual-side gate and semiconductor plasmonic device 102 provides better performance as shown in the propagation loss chart of FIG. 2. When the first gate voltage $V_1$ and the second gate voltage $V_2$ are set to accumulation, a high accumulation carrier density is induced in both hybrid layers the SPPs propagate mainly inside the insulator layer 120, this operation therefore, provides a high SPP density at the output end of the plasmonic device 102, indicating an "ON" state. When the first gate voltage $V_1$ and the second gate voltage $V_2$ are both set in depletion, the carrier densities in the two hybrid layers is not sufficient to sustain an SPP mode, and the propagating SPPs inside the insulator layer 120 are completely shut off, therefore, provides zero SPP density at the output end of the plasmonic device 102, indicating an "OFF" state.

A plasmonic modulator or a plasmonic switch can be made according to the structure of the plasmonic device 102 described above.

Figure 3:
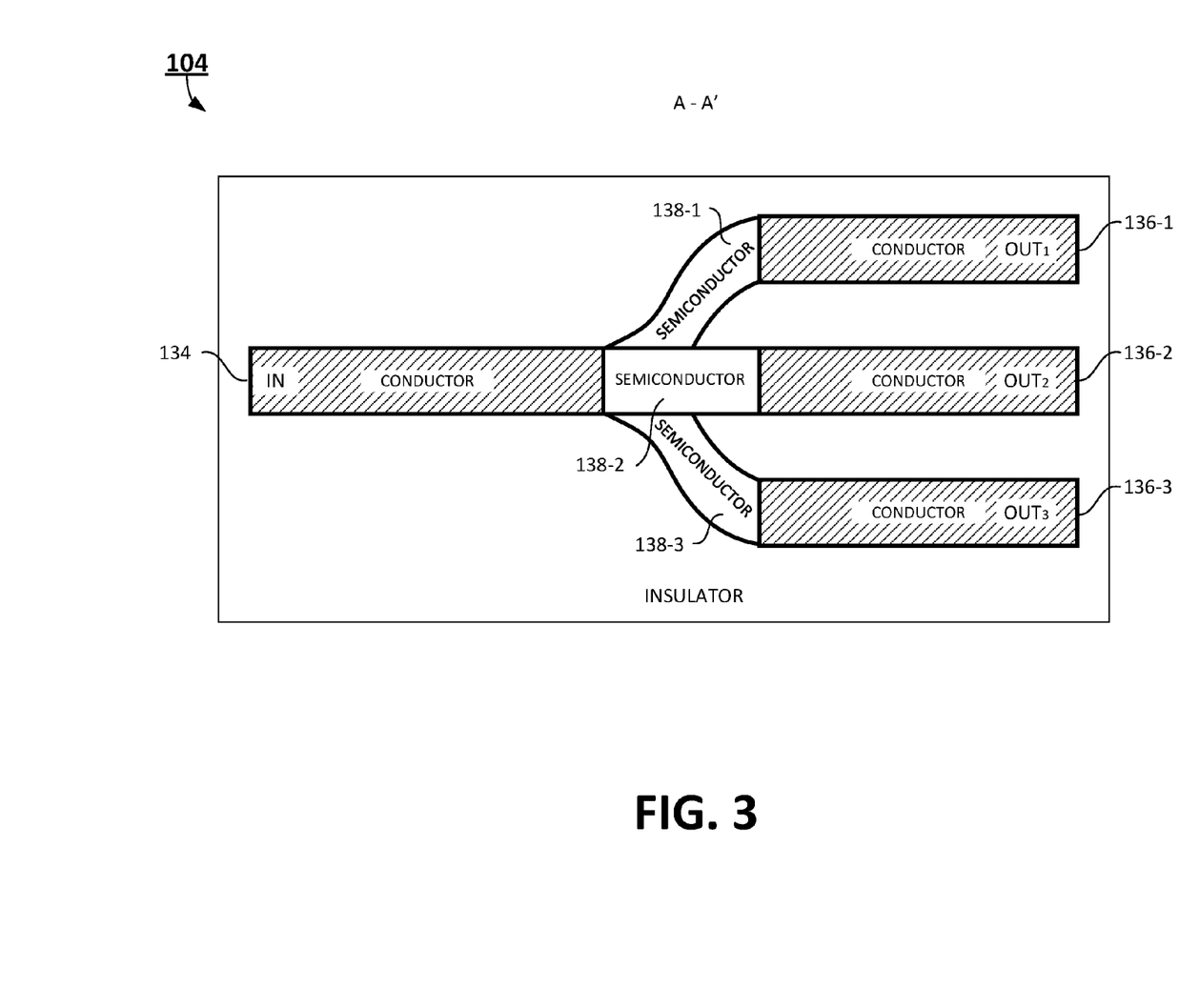
FIG. 3 is a top view of a plasmonic splitter along the A-A' line of FIG. 2 in accordance with exemplary embodiments of the present disclosure.

Another embodiment of the plasmonic device 104 is shown in FIG. 3 according to certain embodiments of the present disclosure. The output conductor segment 116 of the hybrid layer 110 (not shown in FIG. 3) may include one or more output conductor segments 116-$n$ (not shown in FIG. 3). The output segment 136 of the conductor layer 130 may include one or more output segments 136-$n$. The semiconductor segment 112 of the hybrid layer 110 (not shown in FIG. 3) may include one or more semiconductor segments 112-$n$ (not shown in FIG. 3). The second conductor segment 118 of the hybrid layer 110 (not shown in FIG. 3) may include one or more second conductor segments 118-$n$ (not shown in FIG. 3). The conductor segment 132 of the conductor layer 130 may include one or more conductor segments 132-$n$. The second semiconductor segment 138 of the conductor layer 130 may include one or more second semiconductor segments 138-$n$. In certain embodiments, a thin dielectric layer is disposed between the output conductor segments 116-$n$ and the corresponding semiconductor segments 112-$n$, between the input conductor segment 114 and the semiconductor segments 112-$n$, between the output conductor segments 136-$n$ and the corresponding semiconductor segments 132-$n$, between the input conductor segment 134 and the semiconductor segments 132-$n$. In certain embodiments, the conductor segments 114, 118-$n$, 116-$n$, 134, 132-$n$ and 136-$n$, may include electrical conducting materials such as metals, high doped semiconductors, and various nano-tubes, and may be electronically isolated from one another by a thin dielectric layer.

The plasmonic device 104 shown in FIG. 3, may be made by splitting the semiconductor segment 112, the second conductor segment 118, and the output conductor segment 116 of the hybrid layer 110, the conductor segment 132, the second semiconductor segment 138, and the output segment 136 into n segments, here n=3.

In certain embodiments, each of the semiconductor segments 112-$n$ of the hybrid layer 110 may have an input end, and an output end. Each of the input end of the semiconductor segments 112-$n$ of the hybrid layer 110 is plasmonically coupled to the input conductor segment 114. Each of the output end of the semiconductor segments 112-$n$ of the hybrid layer 110 is plasmonically coupled to a corresponding one of the output conductor segments 116-$n$ of the hybrid layer 110. Each of the second conductor segments 118-$n$ of the hybrid layer 110 may include an input end, and an output end. Each of the input end of the second conductor segments 118-$n$ of the hybrid layer 110 is plasmonically coupled to the input conductor segment 114 of the hybrid layer 110. Each of the output end of the second conductor segments 118-$n$ of the hybrid layer 110 is plasmonically coupled to a corresponding one of the output conductor segments 116-$n$ of the hybrid layer 110.

Each of the conductor segments 132-$n$ of the conductor layer 130 may have an input end, and an output end, and each of the input end of the conductor segments 132-$n$ of the conductor layer 130 is plasmonically coupled to the input segment 134 of the conductor layer 130. Each of the output end of the conductor segments 132-$n$ of the conductor layer 130 is plasmonically coupled to a corresponding one of the output segments 136-$n$ of the conductor layer 130. Each of the second semiconductor segments 138-$n$ of the conductor later 130 may have an input end, and an output end. Each of the input end of the second semiconductor segments 138-$n$ of the conductor later 130 is plasmonically coupled to the input segment 134 of the conductor layer 130. Each of the output end of the second semiconductor segments 138-$n$ of the conductor later 130 is plasmonically coupled to a corresponding one of the output segments 136-$n$ of the conductor layer 130.

In certain embodiments, the plasmonic device 104 may include equal number of first gate voltages V1-$n$ and second gate voltages V2-$n$, as the same number of the output conductor segments 116-$n$, the semiconductor segments 112-$n$, and the second conductor segments 118-$n$ of the hybrid layer 110, the output segments 136-$n$, the conductor segments 132-$n$, and the second semiconductor segments 138-$n$ of the conductor layer 130, here n=3. Each of the first gate voltages V1-$n$ is applied between a corresponding one of the semiconductor segments 112-$n$ and the second conductor segments 118-$n$ of the hybrid layer 110 to control the SPP propagation in the insulator layer 120 along the corresponding one of the semiconductor segments 112-$n$ and the second conductor segments 118-$n$ of the hybrid layer 110, respectively. Each of the second gate voltages V2-$n$ is applied between a corresponding one of the conductor segments 132-$n$ and the second semiconductor segments 138-$n$ of the conductor layer 130 to control the SPP propagation in the insulator layer 120 along the corresponding one of the conductor segments 132-$n$ and the second semiconductor segments 138-$n$ of the conductor layer 130, respectively.

A plasmonic splitter can be made according to the structure of the plasmonic device 104 described above. For example, when SPP enter the insulator layer 120 through the input end 122, the SPP may propagate to input ends of the three semiconductor segments 112-$n$ of the hybrid layer 110 and three second semiconductor segments 138-$n$ of the conductor layer 130. Depending on the first gate voltage V1-$n$ and the second gate voltage V2-$n$, the SPP propagation paths along the three semiconductor segments 112-$n$ of the hybrid layer 110 and three second semiconductor segments 138-$n$ of the conductor layer 130 may be selectively shut off or turned on.

For example, when the V1-$_2$ and V2-$_2$ are both negative, and V1-$_1$, V1-$_3$, V2-$_1$, V2-$_3$ are both positive, the plasmonic device 104 is a two-way plasmonic splitter. The first SPP propagation path is formed by entering from the input segment 134, propagating through the insulator layer 120 between the first semiconductor segments 112-1 of the hybrid layer 110 and the first second semiconductor segment 138-1 of the conductor layer 130, and exiting through the insulator layer 120 between the first output conductor segment 116-1 and the first output segment 136-1.

The second SPP path is shut down by the negative V1-$_2$ and V2-$_2$.

The third SPP propagation path is formed by entering from the input segment 134, propagating through the insulator layer 120 between the third semiconductor segments 112-3 of the hybrid layer 110 and the third second semiconductor segment 138-3 of the conductor layer 130, and exiting through the insulator layer 120 between the third output conductor segment 116-3 and the third output segment 136-3.

Figure 4:
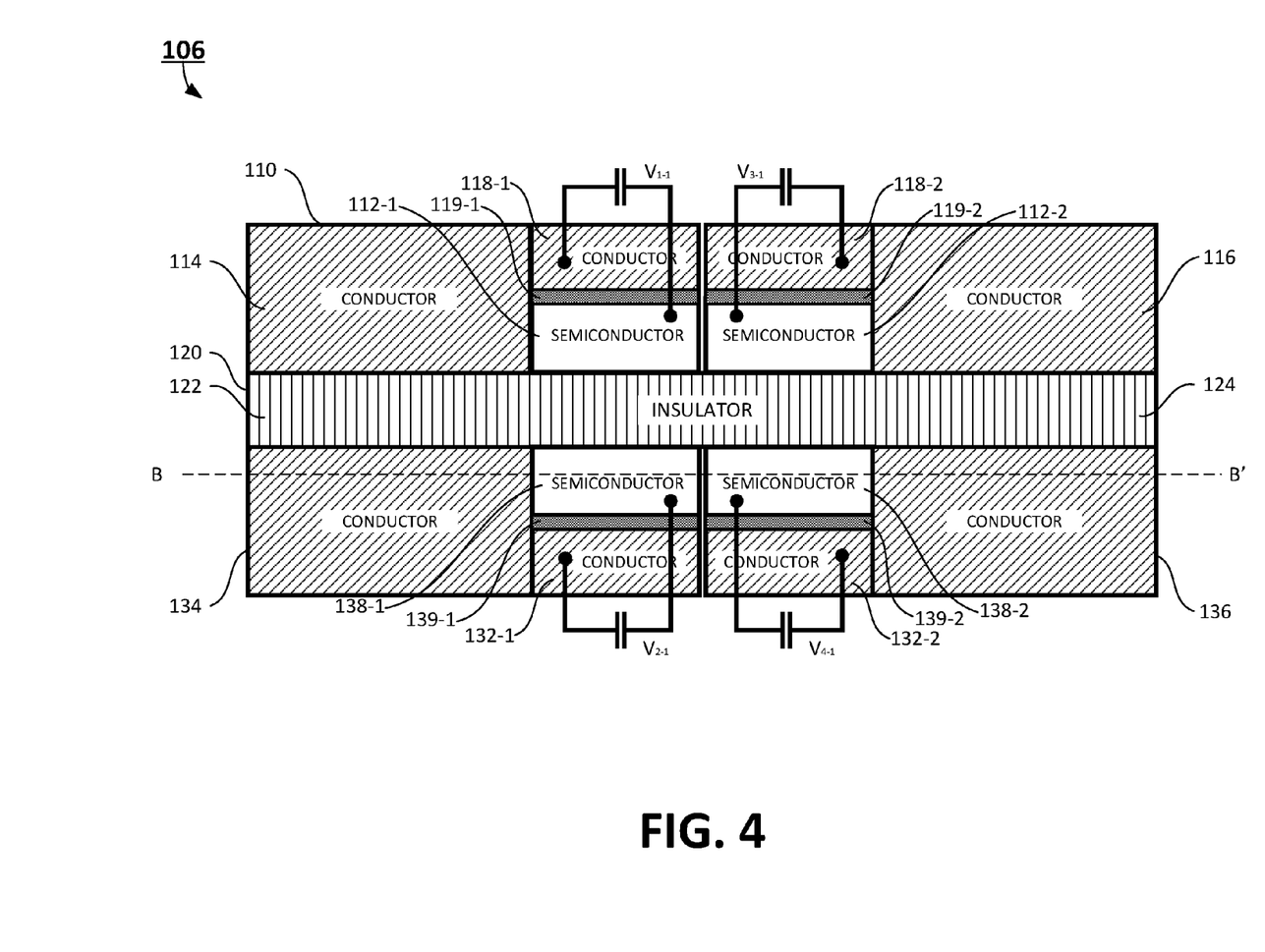
FIG. 4 is a sectional view of a dual-side gate and semiconductor plasmonic mixer in accordance with certain exemplary embodiments of the present disclosure.
Figure 5:
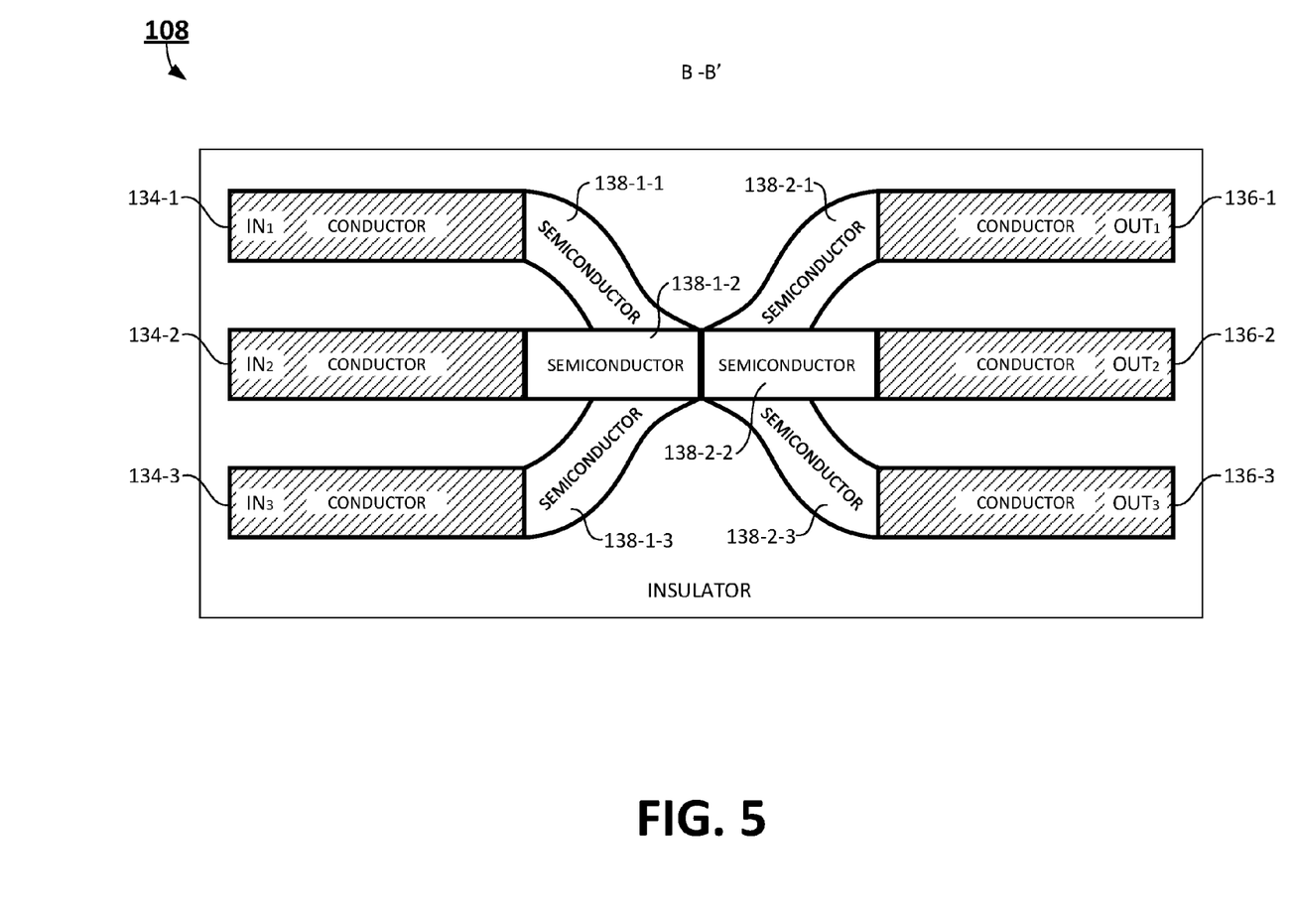
FIG. 5 is a top view of the plasmonic mixer along the B-B' line of FIG. 4 in accordance with exemplary embodiments of the present disclosure.

In certain embodiments, the present invention relates to a plasmonic device 106 as shown in FIG. 4 and FIG. 5. The input conductor segment 114 of the hybrid layer 110 (not shown in FIG. 4) may include one or more input conductor segments 114-$n$ (not shown in FIG. 5). The input segment 134 of the conductor layer 130 may include one or more input segments 134-$n$. The semiconductor segment 112 of the hybrid layer 110 may include one or more input semiconductor segments 112-1-$n$ (not shown in FIG. 5). The second conductor segment 118 of the hybrid layer 110 may include one or more input second conductor segments 118-1-$n$ (not shown in FIG. 5). The conductor segment 132 of the conductor layer 130 may include one or more input conductor segments 132-1-$n$. The second semiconductor segment 138 of the conductor layer 130 may include one or more input second semiconductor segments 138-1-$n$.

In certain embodiments, a thin dielectric layer is disposed between the input conductor segments 114-$n$ and the corresponding input semiconductor segments 112-1-$n$, between the input segments 134-$n$ and the corresponding input semiconductor segments 138-1-$n$, between the output conductor segments 116-$n$ and the corresponding output semiconductor segments 118-2-$n$, between the output segments 136-$m$ and the corresponding output semiconductor segments 138-2-$m$.

In certain embodiments, a thin dielectric layer 119-1 is disposed between the input second conductor segments 118-1-$n$ (not shown in FIG. 5) and the corresponding input semiconductor segments 112-1-$n$. A thin dielectric layer 139-1 is disposed between the input conductor segments 132-1-$n$ and the corresponding input semiconductor segments 138-1-$n$. A thin dielectric layer 119-2 is disposed between the output second conductor segments 118-2-$m$ (not shown in FIG. 5) and the corresponding output semiconductor segments 112-2-$m$. A thin dielectric layer 139-2 is disposed between the output conductor segments 132-2-$m$ and the corresponding output semiconductor segments 138-2-$m$.

The plasmonic device 106 may have the same number of the input conductor segments 114-$n$, the input semiconductor segments 112-1-$n$, and the input second conductor segments 118-1-$n$ of the hybrid layer 110, and the input segments 134-$n$, the conductor segments 132-$n$, the second semiconductor segments 138-$n$ of the conductor layer 130.

In certain embodiments, each of the semiconductor segments 112-1-$n$ of the hybrid layer 110 may include an input end, and an output end. Each of the input end of the semiconductor segments 112-1-$n$ of the hybrid layer 110 is plasmonically coupled to a corresponding one of the input conductor segments 114-$n$. Each of the output end of the semiconductor segments 112-$n$ of the hybrid layer 110 is plasmonically coupled to the output conductor segment 116 of the hybrid layer 110. Each of the second conductor segments 118-$n$ of the hybrid layer 110 may include an input end, and an output end. Each of the input end of the second conductor segments 118-$n$ of the hybrid layer 110 is plasmonically coupled to a corresponding one of the input conductor segment 114-$n$ of the hybrid layer 110, and each of the output end of the second conductor segments 118-$n$ of the hybrid layer 110 is plasmonically coupled to the output conductor segment 116 of the hybrid layer 110.

Each of the conductor segments 132-$n$ of the conductor layer 130 may include an input end, and an output end. Each of the input end of the conductor segments 132-$n$ of the conductor layer 130 is plasmonically coupled to a corresponding one of the input segments 134-$n$ of the conductor layer 130. Each of the output end of the conductor segments 132-$n$ of the conductor layer 130 is plasmonically coupled to the output segments 136 of the conductor layer 130. Each of the second semiconductor segments 138-$n$ of the conductor later 130 may include an input end, and an output end. Each of the input end of the second semiconductor segments 138-$n$ of the conductor later 130 is plasmonically coupled to a corresponding one of the input segments 134-$n$ of the conductor layer 130. Each of the output end of the second semiconductor segments 138-*n* of the conductor later 130 is plasmonically coupled to the output segments 136 of the conductor layer 130.

In certain embodiments, the plasmonic device 106 may include equal number of first gate voltages V1-*n* and second gate voltages V2-*n*, as the same number of the input conductor segments 114-*n*, the input semiconductor segments 112-1-*n*, and the input second conductor segments 118-1-*n* of the hybrid layer 110, and the input segments 134-*n*, the input conductor segments 132-1-*n*, the input second semiconductor segments 138-1-*n* of the conductor layer 130. Each of the first gate voltages V1-*n* is applied between a corresponding one of the input semiconductor segments 112-1-*n* and the input second conductor segments 118-1-*n* of the hybrid layer 110 to control the SPP propagation in the insulator layer 120 along the corresponding input semiconductor segments 112-1-*n* and the input second conductor segments 118-1-*n* of the hybrid layer 110. Each of the second gate voltages V2-*n* is applied between a corresponding one of the input conductor segments 132-1-*n* and the input second semiconductor segments 138-1-*n* of the conductor layer 130 to control the SPP propagation in the insulator layer 120 along the corresponding input conductor segments 132-1-*n* and the input second semiconductor segments 138-1-*n* of the conductor layer 130.

In certain embodiments, the plasmonic device 106 is a plasmonic mixer.

In certain embodiments, the present invention relates to a plasmonic device 108. The output conductor segment 116 of the hybrid layer 110 may include one or more output conductor segments 116-*m*. The output segment 136 of the conductor layer 130 may include one or more output segments 136-*m*. The semiconductor segment 112 of the hybrid layer 110 may further include one or more output semiconductor segments 112-2-*m*. The second conductor segment 118 of the hybrid layer 110 may further include one or more output second conductor segments 118-2-*m*. The conductor segment 132 of the conductor layer 130 may further include one or more output conductor segments 132-2-*m*. The second semiconductor segment 138 of the conductor layer 130 may further include one or more output second semiconductor segments 138-2-*m*. The number m may be different from the number n used in previous sections.

In certain embodiments, the plasmonic device 108 may include same number of the output conductor segments 116-*m*, the output semiconductor segments 112-2-*m*, the output second conductor segments 118-2-*m* of the hybrid layer 110, and the output segments 136-*m*, the output conductor segments 132-2-*m*, the output second semiconductor segments 138-2-*m* of the conductor layer 130.

In certain embodiments, each of the output semiconductor segments 112-2-*m* of the hybrid layer 110 may include an input end, and an output end. Each of the input ends of the output semiconductor segments 112-2-*m* of the hybrid layer 110 is plasmonically coupled to the output end of the input semiconductor segments 112-1-*n*. Each of the output ends of the output semiconductor segments 112-2-*m* of the hybrid layer 110 is plasmonically coupled to a corresponding one of the output conductor segments 116-*m* of the hybrid layer 110.

Each of the output second conductor segments 118-2-*m* of the hybrid layer 110 may include an input end, and an output end. Each of the input ends of the output second conductor segments 118-2-*m* of the hybrid layer 110 is plasmonically coupled to the output end of the input semiconductor segments 112-1-*n*. Each of the output ends of the output second conductor segments 118-2-*m* of the hybrid layer 110 is plasmonically coupled to a corresponding one of the output conductor segments 116-*m* of the hybrid layer 110.

Each of the output conductor segments 132-2-*m* of the conductor layer 130 may include an input end, and an output end. Each of the input ends of the output conductor segments 132-2-*m* of the conductor layer 130 is plasmonically coupled to the output end of the input conductor segments 132-1-*n* of the conductor layer 130. Each of the output ends of the output conductor segments 132-2-*m* of the conductor layer 130 is plasmonically coupled to a corresponding one of the output segments 136-*m* of the hybrid layer 110.

Each of the output second semiconductor segments 138-2-*m* of the conductor later 130 may include an input end, and an output end. Each of the input ends of the output second semiconductor segments 138-2-*m* of the conductor later 130 is plasmonically coupled to the output end of the input second semiconductor segments 138-1-*n* of the conductor layer 130. Each of the output ends of the output second semiconductor segments 138-2-*m* of the conductor later 130 is plasmonically coupled to a corresponding one of the output segments 136-*m* of the conductor layer 130.

In certain embodiments, the plasmonic device 108 may include equal number of third gate voltages V3-*m* and fourth gate voltages V4-*m*, as the same number of the output conductor segments 116-*n*, the output semiconductor segments 112-2-*m*, the output second conductor segments 118-2-*m* of the hybrid layer 110, and the output segments 136-*n*, the output conductor segments 132-2-*m*, the output second semiconductor segments 138-2-*m* of the conductor layer 130.

Each of the third gate voltages V3-*n* is applied between a corresponding one of the output semiconductor segments 112-2-*m* and the output second conductor segments 118-2-*m* of the hybrid layer 110 to control the SPP propagation in the insulator layer 120 along the corresponding output semiconductor segments 112-2-*m* and the output second conductor segments 118-2-*m* of the hybrid layer 110.

Each of the fourth gate voltages V4-*n* is applied between a corresponding one of the output conductor segments 132-2-*m* and the output second semiconductor segments 138-2-*m* of the conductor layer 130 to control the SPP propagation in the insulator layer 120 along the corresponding output conductor segments 132-2-*m* and the output second semiconductor segments 138-2-*m* of the conductor layer 130.

In certain embodiments, the plasmonic device 108 is a plasmonic mixer.

The present disclosure provides a solution to electrically manipulate SPP propagation in plasmonic waveguides, devices and circuits. This solution is fully compatible with large-scale manufacturing and integration. It enables the waveguides, devices and the circuits to process analog and digital signals in a much higher speed and greater bandwidths. It reduces the dimensions of the waveguides, devices, and circuits to sub-wavelength device dimensions, and provides high on/off contrast with low leakage and high extinction rates.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A plasmonic device comprising:
   a conductor layer having a top surface and a bottom surface, the bottom surface of the conductor layer disposed directly on a surface of a substrate, wherein the conductor layer comprises an input conductor segment, an output conductor segment, and a first manipulation segment separating the input conductor segment and the output conductor segment, wherein the first manipulation segment comprises a first semiconductor segment disposed only on a top surface of a first insulator segment, and the first insulator segment disposed only on a top surface of a first conductor segment;
   an insulator layer having a top surface and a bottom surface, an input end, and an output end, the bottom surface of the insulator layer disposed only on the top surface of the conductor layer; and
   a hybrid layer having a top surface and a bottom surface, the bottom surface of the hybrid layer disposed only on the top surface of the insulator layer, wherein the hybrid layer comprises an input conductor segment, an output conductor segment, and a second manipulation segment separating the input conductor segment and the output conductor segment, wherein the second manipulation segment comprises: a second conductor segment disposed only on a top surface of a second insulator segment, and the second insulator segment disposed only on a top surface of a second semiconductor segment, and wherein the hybrid layer is disposed only on the top surface of the insulator layer,
   wherein a first gate voltage is applied between the second conductor segment and the second semiconductor segment of the hybrid layer, and a second gate voltage is applied between the first conductor segment and the first semiconductor segment of the conductor layer such that a plurality of surface plasmon polaritons (SPP) propagates from the input end to the output end of the insulator layer when the first gate voltages and the second gate voltage are set to accumulate the semiconductor segment of the hybrid layer via an electric field, and the SPP propagation ceases when the first gate voltages and the second gate voltage are set to deplete the semiconductor segment of the hybrid layer and the second semiconductor segment of the conductor layer via the electric field.

2. A plasmonic modulator comprising the plasmonic device of claim 1.

3. The plasmonic device of claim 1, wherein
   the output conductor segment of the hybrid layer comprises a plurality of output conductor segments;
   the output conductor segment of the conductor layer comprises a plurality of output conductor segments;
   the second semiconductor segment of the hybrid layer comprises a plurality of second semiconductor segments;
   the second conductor segment of the hybrid layer comprises a plurality of second conductor segments;
   the first conductor segment of the conductor layer comprises a plurality of first conductor segments; and
   the first semiconductor segment of the conductor layer comprises a plurality of first semiconductor segments, wherein the number of the output conductor segments, the second semiconductor segments, and the second conductor segments of the hybrid layer, the output conductor segments, the first conductor segments, and the first semiconductor segments of the conductor layer are the same.

4. The plasmonic device of claim 3, wherein each of the plurality of second semiconductor segments of the hybrid layer comprises an input end, and an output end, and each of the input end of the plurality of semiconductor segments of the hybrid layer is plasmonically coupled to the input conductor segment, and each of the output end of the plurality of second semiconductor segments of the hybrid layer is plasmonically coupled to a corresponding one of the output conductor segments of the hybrid layer;
   each of the plurality of second conductor segments of the hybrid layer comprises an input end, and an output end, and each of the input end of the plurality of second conductor segments of the hybrid layer is plasmonically coupled to the input conductor segment of the hybrid layer, and each of the output end of the plurality of second conductor segments of the hybrid layer is plasmonically coupled to a corresponding one of the output conductor segments of the hybrid layer;
   each of the plurality of first conductor segments of the conductor layer comprises an input end, and an output end, and each of the input end of the plurality of first conductor segments of the conductor layer is plasmonically coupled to the input conductor segment of the conductor layer, and each of the output end of the plurality of first conductor segments of the conductor layer is plasmonically coupled to a corresponding one of the output conductor segments of the conductor layer; and
   each of the plurality of first semiconductor segments of the conductor layer comprises an input end, and an output end, and each of the input end of the plurality of first semiconductor segments of the conductor layer is plasmonically coupled to the input conductor segment of the conductor layer, and each of the output end of the plurality of first semiconductor segments of the conductor layer is plasmonically coupled to a corresponding one of the output conductor segments of the conductor layer.

5. The plasmonic device of claim 4 further comprising a plurality of first gate voltages and a plurality of second voltages, wherein each of the first gate voltages is applied between a corresponding one of the second semiconductor segments and the second conductor segments of the hybrid layer separated by a dielectric layer to control the SPP propagation in a metal-insulator-metal (MIM) waveguide formed by the insulator layer sandwiched between the conductor and hybrid layers along the corresponding one of the semiconductor segments and the second conductor segments of the hybrid layer, and each of the second gate voltages is applied between a corresponding one of the conductor segments and second semiconductor segments of the conductor layer to control the SPP propagation in the insulator layer along the corresponding one of the conductor segments and the second semiconductor segments of the conductor layer.

6. A plasmonic splitter comprising the plasmonic device of claim 4.

7. A plasmonic device comprising:
   a conductor layer having a top surface and a bottom surface, the bottom surface of the conductor layer disposed directly on a surface of a substrate, wherein the conductor layer comprises a plurality of first input conductor segments, an output conductor segment, and a first manipulation segment separating the plurality of input conductor segments and the output conductor segment, wherein the first manipulation segment comprises a plurality of first semiconductor segments disposed only on a top surface of a first insulator segment, and the first insulator segment disposed only on a top surface of a plurality of first conductor segments;

an insulator layer having a top surface and a bottom surface, an input end, and an output end, the bottom surface of the insulator layer disposed only on the top surface of the conductor layer; and a hybrid layer having a top surface and a bottom surface, the bottom surface of the hybrid layer disposed only on the top surface of the insulator layer, wherein the hybrid layer comprises a plurality of second input conductor segments an output conductor segment, and a second manipulation segment separating the plurality of second input conductor segments and the output conductor segment, wherein the second manipulation segment comprises: a second conductor segment disposed only on a top surface of the plurality of input conductor segments, and the plurality of input conductor segments disposed only on a top surface of a plurality of second semiconductor segments, and wherein the hybrid layer is disposed only on the top surface of the insulator layer;

wherein a first gate voltage is applied between the plurality of second conductor segments and the plurality of second semiconductor segments of the hybrid layer, and each of a plurality of second gate voltages is applied between one of the plurality of first conductor segments and a corresponding one of the plurality of first semiconductor segments of the conductor layer such that a plurality of surface plasmon polaritons (SPP) propagate from the input end to the output end of the insulator layer when the plurality of gate voltages is set to accumulate the semiconductor segment via an electric field, and the SPP propagation ceases when the plurality of gate voltages is set to deplete the plurality of first and second semiconductor segments via the electric field, wherein the number of the first input conductor segments, the input conductor segments, and the second first semiconductor segments of the conductor layer, the input conductor segments, the second conductor segments, and the second semiconductor segments of the hybrid layer are the same.

8. The plasmonic device of claim 7, wherein each of the plurality of second semiconductor segments of the hybrid layer comprises an input end, and an output end, and each of the input end of the plurality of second semiconductor segments of the hybrid layer is plasmonically coupled to a corresponding one of a plurality of second input semiconductor segments, and each of the output end of the plurality of second semiconductor segments of the hybrid layer is plasmonically coupled to a second output semiconductor segment of the hybrid layer;

each of the plurality of second conductor segments of the hybrid layer comprises an input end, and an output end, and each of the input end of the plurality of second conductor segments of the hybrid layer is plasmonically coupled to a corresponding one of a plurality of second input conductor segments of the hybrid layer, and each of the output end of the plurality of second conductor segments of the hybrid layer is plasmonically coupled to a second output conductor segment of the hybrid layer;

each of the plurality of first conductor segments of the conductor layer comprises an input end, and an output end, and each of the input end of the plurality of first conductor segments of the conductor layer is plasmonically coupled to a corresponding one of a plurality of first input conductor segments of the conductor layer, and each of the output end of the plurality of first conductor segments of the conductor layer is plasmonically coupled to a first output conductor segment of the conductor layer; and each of the plurality of first semiconductor segments of the conductor layer comprises an input end, and an output end, and each of the input end of the plurality of first semiconductor segments of the conductor layer is plasmonically coupled to a corresponding one of a plurality of first input semiconductor segments of the conductor layer, and each of the output end of the plurality of first semiconductor segments of the conductor layer is plasmonically coupled to a first output semiconductor segments of the conductor layer.

9. The plasmonic device of claim 8 further comprising a plurality of first gate voltages and a plurality of second gate voltages, wherein each of the first gate voltages is applied between a corresponding one of the second input semiconductor segments and the second input conductor segments of the hybrid layer to control the SPP propagation in the insulator layer along the corresponding one of the second semiconductor segments and the second conductor segments of the hybrid layer, and each of the second gate voltages is applied between a corresponding one of the first conductor segments and the first semiconductor segments of the conductor layer to control the SPP propagation in the insulator layer along the corresponding one of the first conductor segments and first semiconductor segments of the conductor layer.

10. A plasmonic mixer comprising the plasmonic device of claim 9.

11. The plasmonic device of claim 9, wherein the output conductor segment of the hybrid layer comprises a plurality of second output conductor segments;

the output conductor segment of the conductor layer comprises a plurality of first output conductor segments;

the second semiconductor segment of the hybrid layer further comprises a plurality of second semiconductor segments;

the second conductor segment of the hybrid layer further comprises a plurality of second conductor segments;

the first output conductor segment of the conductor layer further comprises a plurality of first output conductor segments; and the first semiconductor segment of the conductor layer further comprises a plurality of first output semiconductor segments, wherein the number of the second output conductor segments and the number of the second output semiconductor segments, the number of the first output segments of the hybrid layer, the number of the first output semiconductor segments and the number of the first output conductor segments, the number of the second output segments of the conductor layer are the same.

12. The plasmonic device of claim 11, wherein each of the plurality of second semiconductor segments of the hybrid layer comprises an input end, and an output end, and each of the input end of the plurality of second semiconductor segments of the hybrid layer is plasmonically coupled to the output end of the input semiconductor segments, and each of the output end of the plurality of second semiconductor segments of the hybrid layer is plasmonically coupled to a corresponding one of the second output semiconductor segments of the hybrid layer;

each of the plurality of second conductor segments of the hybrid layer comprises an input end, and an output end, and each of the input end of the plurality of second conductor segments of the hybrid layer is plasmonically coupled to the output end of the input semiconductor segments, and each of the output end of the plurality of second conductor segments of the hybrid layer is plasmonically coupled to a corresponding one of the second output conductor segments of the hybrid layer;

each of the plurality of first conductor segments of the conductor layer comprises an input end, and an output end, and each of the input end of the plurality of first conductor segments of the conductor layer is plasmonically coupled to the output end of the input conductor segments of the conductor layer, and each of the output end of the plurality of first conductor segments of the conductor layer is plasmonically coupled to a corresponding one of the first output conductor segments of the hybrid layer; and each of the plurality of second semiconductor segments of the conductor layer comprises an input end, and an output end, and each of the input end of the plurality of second semiconductor segments of the conductor layer is plasmonically coupled to the output end of the input second semiconductor segments of the conductor layer, and each of the output end of the plurality of second semiconductor segments of the conductor layer is plasmonically coupled to a corresponding one of the first output semiconductor segments of the conductor layer.

13. The plasmonic device of claim 12 further comprising a plurality of third gate voltages and a plurality of fourth gate voltages, wherein each of the third gate voltages is applied between a corresponding one of the second semiconductor segments and second conductor segments of the hybrid layer to control the SPP propagation in the insulator layer along the corresponding one of the second semiconductor segments and second conductor segments of the hybrid layer, and each of the fourth gate voltages is applied between a corresponding one of the first conductor segments and first semiconductor segments of the conductor layer to control the SPP propagation in the insulator layer along the corresponding one of the first conductor segments and the first semiconductor segments of the conductor layer.

14. A plasmonic mixer comprising the plasmonic device of claim 13.

* * * * *